May 29, 1951  E. BROMBERG ET AL  2,554,811
FUNCTIONAL POTENTIOMETER
Filed Feb. 3, 1948  3 Sheets-Sheet 2
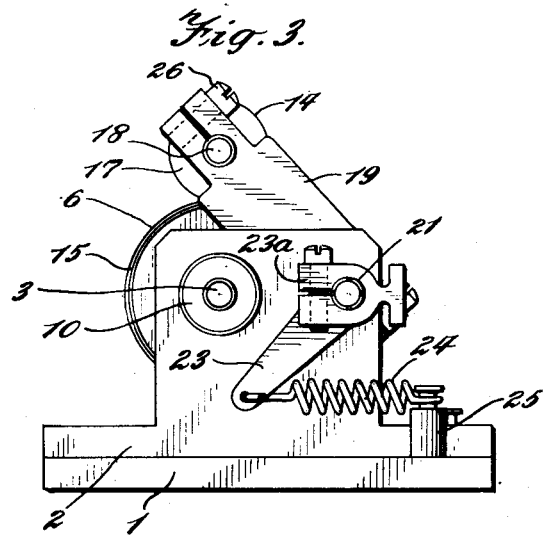
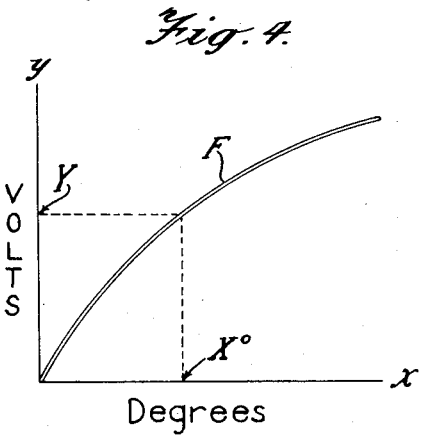
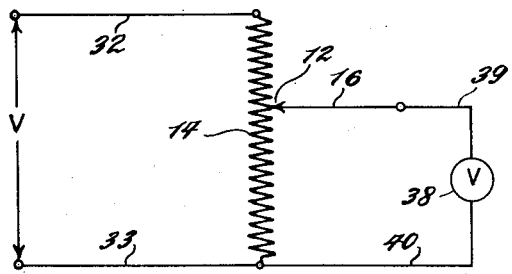
INVENTORS
Eleazer Bromberg
and Lawrence I. Freedman
BY Burgess, Ryan & Hicks
ATTORNEYS May 29, 1951 E. BROMBERG ET AL 2,554,811
FUNCTIONAL POTENTIOMETER
Filed Feb. 3, 1948 3 Sheets-Sheet 3

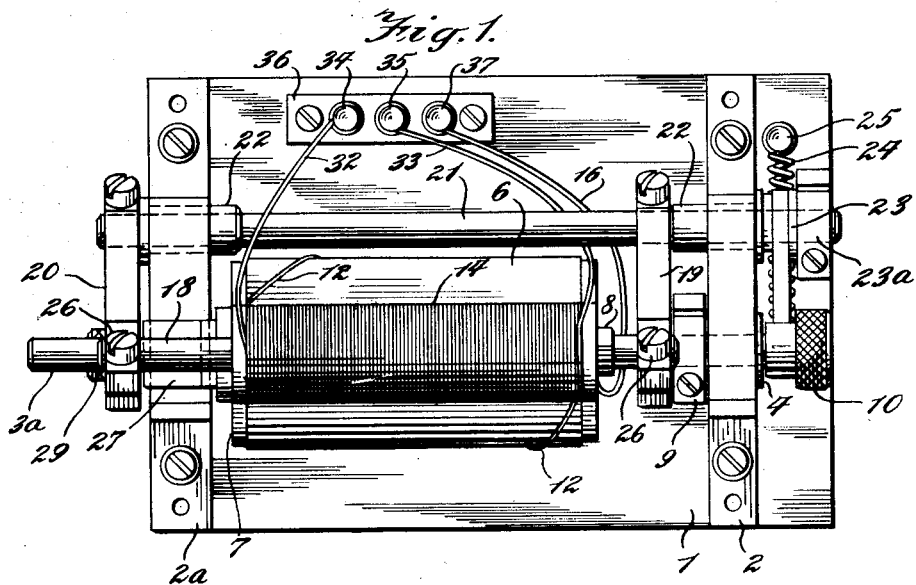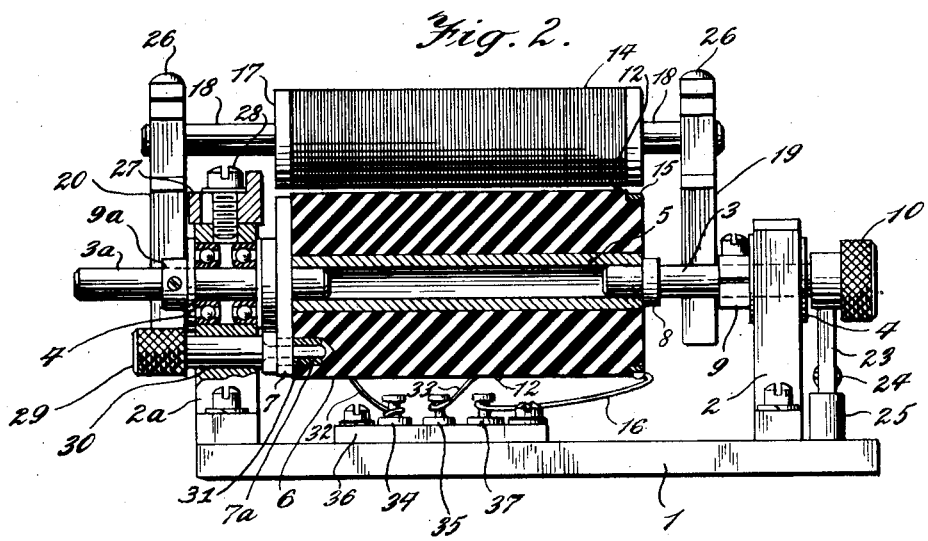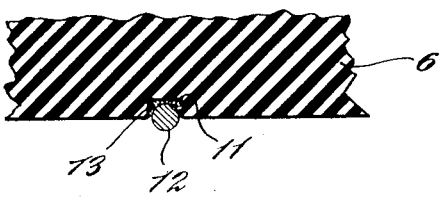

INVENTORS
Eleazer Bromberg
and Lawrence I. Freedman
BY Burgess, Ryan & Hicks
ATTORNEYS Patented May 29, 1951

2,554,811

UNITED STATES PATENT OFFICE 2,554,811

FUNCTIONAL POTENTIOMETER

Eleazer Bromberg, New York, N. Y., and Lawrence I. Freedman, Ridgefield, N. J., assignors to Reeves Instrument Corporation, New York, N. Y., a corporation of New York Application February 3, 1948, Serial No. 6,084

9 Claims. (Cl. 201—60)

1

This invention relates to a functional potentiometer and more particularly to a movable contact member for an electrical measuring and/or controlling apparatus of the potentiometer type.

The present invention has for an object the provision of an electrical measuring instrument of the potentiometer type wherein the movement of a movable contact relative to a uniformly wound resistance is controlled in a predetermined manner, for example, in accordance with a mathematically expressed function. It has been proposed, as in U. S. Letters Patent No. 2,114,330 to wind the resistance element to introduce varying values of the resistance per increment of travel of an associated slide contact. However, it is difficult and costly to wind a resistance in this manner and to have it conform accurately to the function being reproduced. However, a movable contact member made in accordance with the present invention may be made accurately and quickly at low cost. In addition any reasonable function may be readily reproduced by the contact member of the present invention.

The foregoing and other objects and advantages of the invention will be best understood from the following description and the accompanying drawings in which:

Fig. 1 is a plan view of a potentiometer embodying the invention;

Fig. 2 is a side view in partial section of the potentiometer illustrated in Fig. 1;

Fig. 2a is a section view on an enlarged scale of a portion of the potentiometer illustrated in Fig. 2;

Fig. 3 is an end view of the potentiometer illustrated in Fig. 1;

Figure 6:
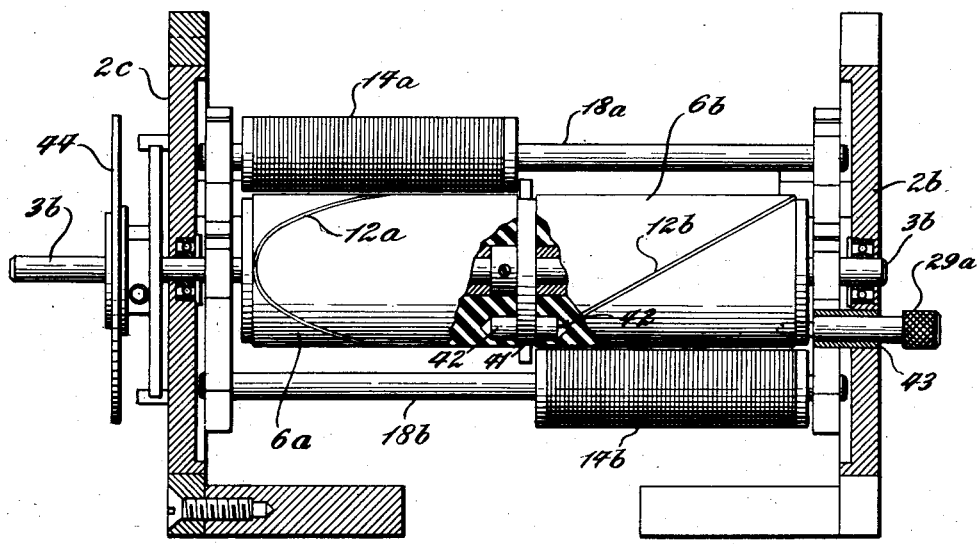
Figure 7:
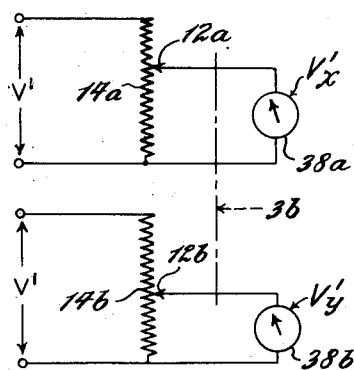

Fig. 4 graphically illustrates a typical function that may be reproduced by the movable contact member of the potentiometer illustrated in Fig. 1;

Fig. 5 is a diagrammatic circuit for a potentiometer embodying the invention; and Fig. 6 is a side view in partial section showing potentiometers embodying the invention as applied to a resolver;

Fig. 7 is a diagrammatic circuit for the resolver illustrated in Fig. 6; and

Figure 8:
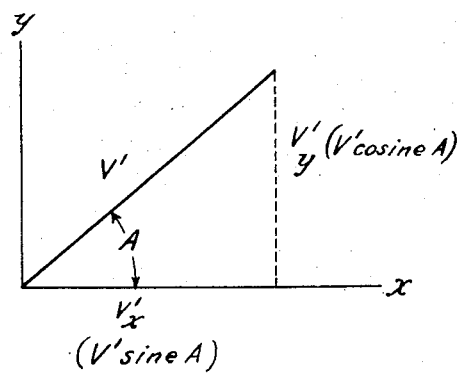

Fig. 8 is a graphical analysis of a use of the resolver illustrated in Fig. 6.

Referring to the drawings in detail, there is a base 1 having spaced brackets or supports 2 and 2a extending upwardly therefrom. Shafts 3 and 3a are rotatably mounted in bearings 4 in the supports 2 and 2a, respectively, and extend into a sleeve 5 that is centrally located in a contact-carrying cylinder 6. The cylinder 6 is thus ro-

2 tatably supported between the supports 2 and 2a.

A driving disc 7 is secured to the shaft 3a supported in the support 2a and has a pin 7a that extends into the cylinder 6, as shown in Fig. 2, to make a driving connection with the cylinder 6. An input end of the shaft 3a extends beyond the support 2a and may have a gear or other suitable driving connection secured thereto. The shaft 3 supporting the opposite end of the cylinder 6 has an enlarged portion 8 that abuts against the sleeve 5 at the end of the cylinder and holds the cylinder in place.

The shafts 3 and 3a and the cylinder 6 supported thereon are held against lateral movement by a clamp 9 secured to the shaft 3 and a collar 9a secured to the shaft 3a. A knob 10 may be provided on the end of the shaft 3 so that the shaft 3 may be withdrawn from the sleeve 5 in the cylinder 6 so as to permit the insertion of a new cylinder when desired.

The contact-carrying cylinder 6 is made of insulating material and has a groove 11 cut in its surface to receive a contact member 12. The groove 11 follows a convolute path about the surface of the cylinder 6 and is cut to reproduce a predetermined non-linear function such as may be expressed mathematically by $x = f(y)$. The contact member 12 is therefore also of convolute shape and may be held in groove 11 by a suitable cement 13. The contact member 12 projects slightly above the surface of the cylinder 6 to make contact with a resistance element 14 and is electrically connected to a conductor ring 15 carried on the end of the cylinder 6. A suitable electrical connection may thus be made to the contact member 12 by soldering a flexible wire 16 to the conductor ring 15.

The resistance element 14 may be uniformly wound on a cylindrical form 17 so that its resistance characteristics will be linear; i. e., uniform per increment of distance along the resistance. The form 17 carrying the resistance 14 is supported on a shaft 18 above the contact carrying cylinder 6 in a position where contact is made with the resistance 14 by the contact 12 of the contact-carrying cylinder 6.

The shaft 18 supporting the resistance 14 is held at each end by arms 19 and 20. The arms 19 and 20 are secured to a rock shaft 21 that is mounted in bearings 22 carried by the supports 2 and 2a. A lever 23 is secured to one end of the rock shaft 21 and a spring 24 is connected between the end of the lever 23 and a pin 25 on the base 1. The spring 24 acting through the lever 23 turns the rock shaft 21 so that the resistance element 14 is held in engagement with the contact 12 carried by the cylinder 6. This arrangement also permits the resistance element 14 to be raised so that the contact-carrying cylinder 6 may be replaced or a cylinder having a contact representing a different function may be inserted.

The rock shaft 21 is held against lateral movement by the arm 20 that is secured to the shaft 21 on the outside of the support 2a and a clamp 23a that is secured to the shaft 21 on the outside of the support 2. The clamp 23a also secures the lever 23 to the shaft 21 and permits adjustment of the lever 23 in order to control the tension of the spring 24.

The ends of the arms 19 and 20 are slotted and are provided with clamping screws 26 which when loosened permit the shaft 18 and the form 17 with the resistance 14 to be moved laterally so as to bring the resistance 14 into alignment with the contact-carrying cylinder 6. To align the resistance 14 with the contact-carrying cylinder 6 there is a lateral aligning block 27 that is slidably secured to the support 2a by a stud 28. In aligning the resistance 14 with the contact 12 the vertical face of the block 27 is brought into engagement with the outer surface of the driving disc 7 and the resistance 14 is then moved laterally until the end of the cylinder 17 strikes the vertical face of the block 27 and the clamping screws 26 are tightened. The contact-carrying cylinder 6 and the form 17 are constructed so that when they are aligned in this manner, the resistance 14 is properly positioned in relation to the contact carried by the cylinder 6. After such alignment, the aligning block 28 is moved to the position shown in Fig. 2.

As illustrated in Fig. 2, a removable pin 29 may be inserted into the contact-carrying cylinder 6 through an opening 30 in the support 2a and an opening 31 in the driving disc 7 and the driving pin 7a. This positions the contact 12 in zero position relative to the resistance 14 and permits the driving connections to be made to the input end of the shaft 3a with the contact-carrying cylinder 6 in zero position relative to the resistance 14. When such driving connections have been made, the pin 29 is removed in order to permit the cylinder 6 to be rotated.

The purpose of the potentiometer embodying the invention is to reproduce any reasonable non-linear function such as one that may be mathematically expressed as $x = f(y)$, an example of which is illustrated in Fig. 4. Thus, the point at which the convolute contact member 12 contacts with the resistance 14 will be varied along the resistance 14 in accordance with the non-linear function that has been reproduced in positioning the contact member 12 on the cylinder 6 for equal increments of angular movement of the cylinder 6.

Wires 32 and 33 connect the ends of the resistance 14 to terminals 34 and 35, respectively, of a terminal block 36. The wire 16 from the conductor ring 15 is also connected to a terminal 37 of the terminal block 36.

For the purposes of illustration, a circuit showing the connections to a potentiometer embodying the invention are illustrated in Fig. 5. In this circuit a source of voltage V is connected across the resistance 14 through the wires 32 and 33. The movable contact 12 is connected through the wire 16 to one side of a voltmeter 38 by a wire 39. The other side of the voltmeter is connected by a wire 40 to zero end of the resistance 14.

Since the resistance characteristics of the resistance wire 14 are linear the voltage drop from any point on the resistance 14 to its end will be a function of the distance of such a point to the end of the resistance. However, as has been stated, the contact element 12 is positioned on the cylinder 6 in accordance with a predetermined, non-linear function so that the point of contact of the contact 12 with the resistance 14 for a given angle of rotation of the cylinder 6 will depend on the function reproduced. Thus, assuming that the contact member 12 has been positioned on the cylinder 6 in accordance with the curve F as illustrated in Fig. 4 and the input shaft 3a is rotated X degrees, then the voltage reading of the voltmeter 38 will correspond to the voltage Y as determined from the curve F at X degrees.

The groove 11 in the cylinder 6 for receiving the contact element 12 may be cut in the cylinder 4 in any suitable manner. This may be done by plotting the function on a sheet having a surface area corresponding in size and shape to the developed surface area of the cylinder 6. The sheet with the function plotted on it may then be placed around the cylinder 6 and the groove 11 may be cut by following the plotted curve with a suitable cutting tool. Another method is to place the cylinder 6 in a lathe and to regulate the rate at which the lathe turns and the rate at which the cutting tool is fed forward in accordance with the function being reproduced.

A resolver, as illustrated in Fig. 6, employs two potentiometers such as have been described with contact elements that produce voltage drops in their respective resistance corresponding to the sine and cosine functions of the angle through which the contact carrying cylinders are turned. One use of such a device is to determine the horizontal and vertical components of a line of known length and direction where such a line may represent force, velocity, distance, etc.

In the resolver there are a pair of contact-carrying cylinders 6a and 6b supported between brackets 2b and 2c on a common shaft 3b. The shaft 3b is rotatably mounted in the bracket 2b and 2c and has a driving disc 41 located between the cylinders 6a and 6b secured to it. The driving disc 41 has driving pins 42 that extend into the ends of the cylinders 6a and 6b and drive the cylinders with the shaft. Resistance elements 14a and 14b are supported, respectively, on shafts 18a and 18b so that the resistance element 14a is aligned with the cylinder 6a and the resistance element 14b is aligned with the cylinder 6b. Thus, a contact element 12a carried by the cylinder 6a makes contact with the resistance element 14a and a contact element 12b carried by the cylinder 6b makes contact with the resistance element 14b.

A removable, zeroing pin 29a extends through a sleeve 43 in the bracket 2b and projects into the contact-carrying cylinder 6b to position the contact members 12a and 12b in zero position relative to their respective resistances 14a and 14b. The input end of the shaft 3b extends beyond the bracket 2c and may have a dial 44 secured to it.

The contact members 12a and 12b extend convolutely around the cylinders 6a and 6b and reproduce sine and cosine functions, respectively, of the angles through which the cylinders may be turned. The potentiometer units of the resolver are arranged so that when they are connected in a circuit as shown in Fig. 7 with a voltage V' applied across each of the resistances 14a and 14b, the readings of voltmeters 38a and 38b are respectively proportional to sine and cosine functions of the angle through which the shaft 3b has been turned.

For example, when as illustrated in Fig. 8, the voltage V' represents a known distance, force, velocity, etc., and the angle A through which the cylinders are turned represents the direction of the line V' with the horizontal, the reading of voltmeter 38a will be V'x or equal to (V' sine A) and the reading of voltmeter 38b will be V'y or equal to (V' cosine A) thereby resolving the line V' into its vertical (y) and horizontal (x) components.

It should be noted that in the resolver illustrated the contact members 12a and 12b on the cylinders 6a and 6b are offset by 90 degrees in relation to each other, and since the angular functions reproduced by the respective contacts vary from zero degrees to 90 degrees, the zero point of the contacts will be at the center of their respective resistances. Thus depending upon the direction the cylinders are rotated, the readings of the voltmeters may be more or less than the voltage readings at the zero position by an amount proportional to the function of the angle of rotation.

It will be understood that the devices shown and described herein and the examples set forth are illustrative of devices in which the present invention may be incorporated and how such devices may be utilized. It will also be understood that various changes and modifications in such devices may be made by those skilled in the art without departing from the scope of the invention as defined by the appended claims.

We claim:

1. In a variable electrical resistance unit of the class described, the combination which includes a base, a rotatable contact carrying cylinder supported on said base, a drive shaft connected to said cylinder, a contact member carried by said rotatable cylinder, said contact member extending axially of said cylinder in a convolute path around the cylinder having the configuration of a non-linear function plotted on rectangular coordinates, the axial displacement of said contact member from a zero position on the cylinder representing the y coordinates of said function and the angular displacement of the contact member from said zero position representing the x coordinates of said function, a rock shaft supported on said base, a resistance element having linear resistance characteristics adjustably supported on said rock shaft and engaging with the contact member carried by said rotatable cylinder at one point thereof, said resistance element being adjustable axially with respect to the contact member on the rotatable cylinder, resilient means connected to said rock shaft and urging said rock shaft in a direction to maintain the resistance element in contact with the contact member and zeroing means carried by the base, said zeroing means being engageable with the rotatable cylinder at a position of the cylinder where one end of the contact member carried thereon contacts with one end of the resistance element.

2. In a variable electrical resistance unit of the character described, a base, a rotatable contact carrying cylinder supported on said base, said cylinder having a groove cut in the surface thereof, said groove extending axially of the cylinder in a convolute path around the cylinder having the configuration of a non-linear function plotted on rectangular coordinates, the axial displacement of said groove from a zero point on the cylinder representing y coordinates of said function and the angular displacement of said groove from said zero point representing x coordinates of said function, a contact member secured in said groove and following the path thereof, said contact member projecting from the surface of the cylinder, a resistance element pivotally mounted adjacent and extending parallel to the cylinder and resilient means connected to and urging said resistance element in a direction to maintain said resistance element in contact with the contact member on the cylinder.

3. In a variable electrical resistance unit of the character described, a base, a rotatable contact carrying cylinder supported on said base, said cylinder having a groove cut in the surface thereof, said groove extending axially of the cylinder in a convolute path around the cylinder having the configuration of a non-linear function plotted on rectangular coordinates, the axial displacement of said groove from a zero point on the cylinder representing y coordinates of said function and the angular displacement of said groove from said zero point representing x coordinates of said function and a contact member secured in said groove and following the path thereof, said contact member projecting from the surface of the cylinder.

4. In a variable electric resistance unit of the character described, the combination which includes a rotatable cylinder, a contact member carried by said cylinder, said contact member extending axially of the cylinder in a convolute path around the cylinder, a pivoted arm located at each end of said cylinder, a resistance element having linear resistance characteristics adjustably supported at the ends of said arms and extending parallel to said cylinder, said resistance element being adjustable axially with respect to the cylinder, resilient means connected to said arms, said resilient means urging the resistance element carried by the arms into contact with the contact member on the rotatable cylinder and zeroing means engageable with the cylinder at a position of the cylinder where one end of the contact member carried thereon is in contact with one end of the resistance element.

5. In a variable electrical resistance unit, the combination as defined in claim 4 wherein the surface of the rotatable cylinder has a groove cut therein corresponding to the configuration of the contact member carried thereon and said contact member consists of a strip of conductive material secured in said groove.

6. A variable electrical resistance unit of the class described including a base, a rotatable contact carrying cylinder removably supported on said base, a drive shaft connected to said cylinder, said contact member extending axially of said cylinder in a convolute path, a rock shaft supported on said base, a resistance element having linear resistance characteristics supported on said rock shaft and engaging at one point with the contact member carried by said rotatable cylinder, said resistance element axially adjustable with respect to the cylinder for alignment of the resistance with the contact member on the cylinder, zeroing means carried by the base, said zeroing means being engageable with the cylinder at a position of the cylinder where one end of the contact member on the cylinder engages with one end of the resistance element, and resilient means connected to said rock shaft and urging said rock shaft in a direction to hold said resistance element in engagement with said contact member.

7. A variable electrical resistance unit of the class described including a base, a rotatable contact carrying cylinder removably supported on said base, drive shaft connected to said cylinder, said contact member extending axially of said cylinder in a convolute path, the surface of said cylinder having a groove cut therein corresponding to the configuration of the contact member with the contact member being secured in said groove, a rock shaft supported on said base, a resistance element having linear resistance characteristics supported on said rock shaft and engaging at one point with the contact member carried by said rotatable cylinder and resilient means connected to said rock shaft and urging said rock shaft in a direction to hold said resistance element in engagement with said contact member.

8. In a variable electrical resistance unit of the class described, the combination which includes a base, a rotatable contact carrying cylinder supported on said base, a drive shaft connected to said cylinder, a contact member carried by said rotatable cylinder, said contact member extending axially of said cylinder in a convolute path around the cylinder having a configuration of a non-linear function plotted on rectangular coordinates, a rock shaft supported on said base, a resistance element having linear resistance characteristics adjustably supported on said rock shaft and engaging with the contact member carried by said rotatable cylinder at one point thereof, said resistance element being adjustable axially with respect to the contact member on the rotatable cylinder, resilient means connected to said rock shaft and urging said rock shaft in a direction to maintain the resistance element in contact with the contact member and zeroing means carried by the base, said zeroing means being engageable with the rotatable cylinder at a position of the cylinder where one end of the contact member carried thereon contacts with one end of the resistance element.

9. In a variable resistance unit, the combination as described in claim 8 wherein the surface of the rotatable cylinder has a groove cut therein corresponding to the configuration of the contact member and the contact member is secured in said groove.

ELEAZER BROMBERG.
LAWRENCE I. FREEDMAN.

REFERENCES CITED

The following references are of record in the file of this patent:

UNITED STATES PATENTS

| Number | Name | Date |
| --- | --- | --- |
| 1,364,967 | Victor | Jan. 11, 1921 |
| 1,858,364 | Koenig | May 17, 1932 |
| 1,940,102 | Robertson | Dec. 19, 1933 |
| 1,971,238 | Silling | Aug. 21, 1934 |
| 2,319,322 | Hefel | May 18, 1943 |
| 2,417,311 | Luck | Mar. 11, 1947 |
| 2,468,344 | Pasini | Apr. 26, 1949 |

FOREIGN PATENTS

| Number | Country | Date |
| --- | --- | --- |
| 117,873 | Switzerland | Dec. 1, 1926 |
| 135,523 | Great Britain | Dec. 4, 1919 |
| 503,574 | Germany | July 24, 1930 |
| 585,416 | France | Feb. 28, 1925 |